Figure 1:
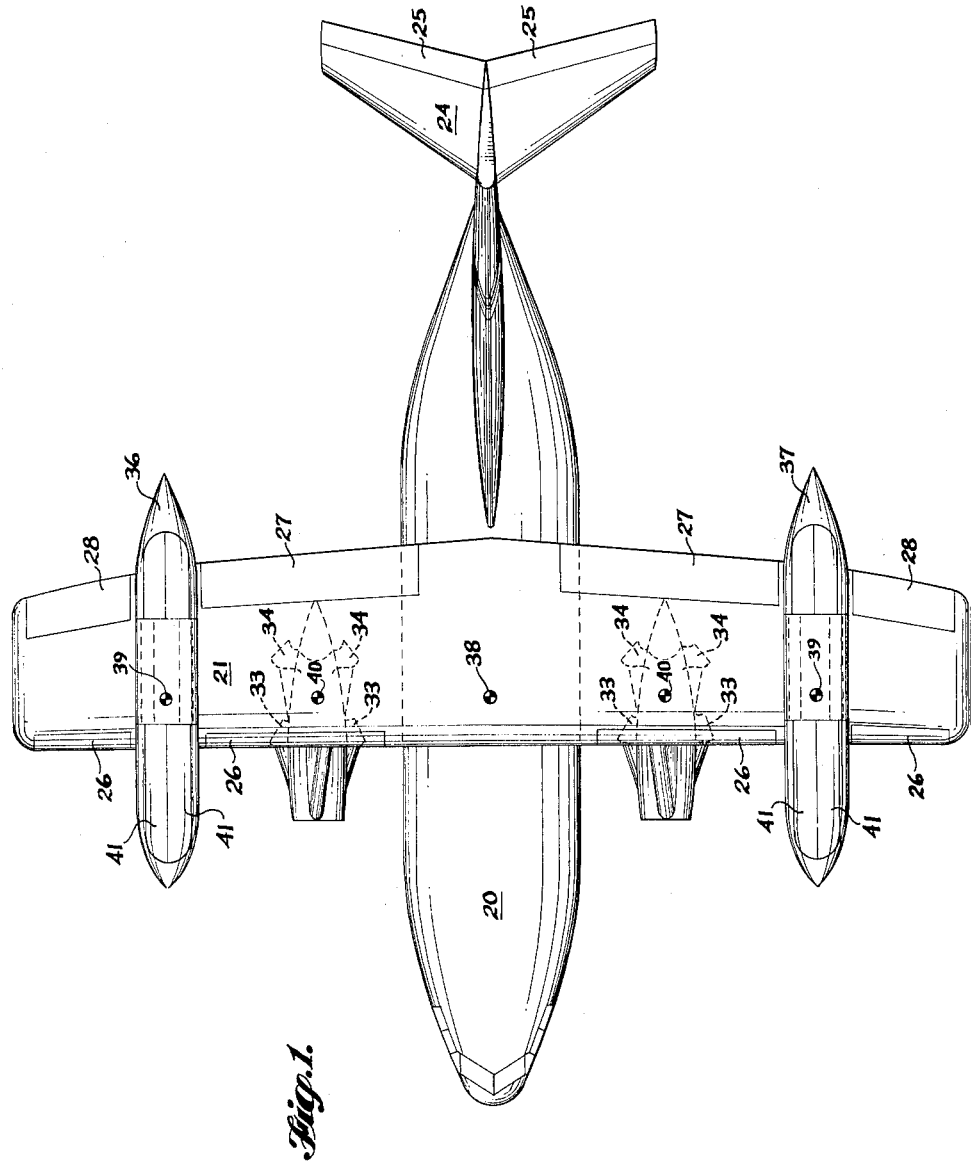

July 5, 1966  T. W. SCHMIDT  3,259,338
AIRCRAFT FOR SHORT AND/OR VERTICAL TAKE-OFF AND LANDING
Filed Feb. 17, 1964  3 Sheets-Sheet 1

INVENTOR.
THEODORE W. SCHMIDT
BY
*Erwin F. Adams*
ATTORNEY

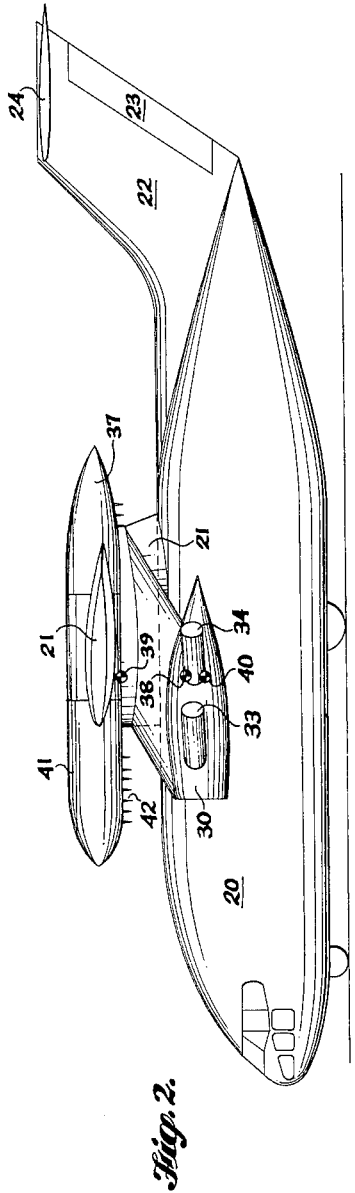
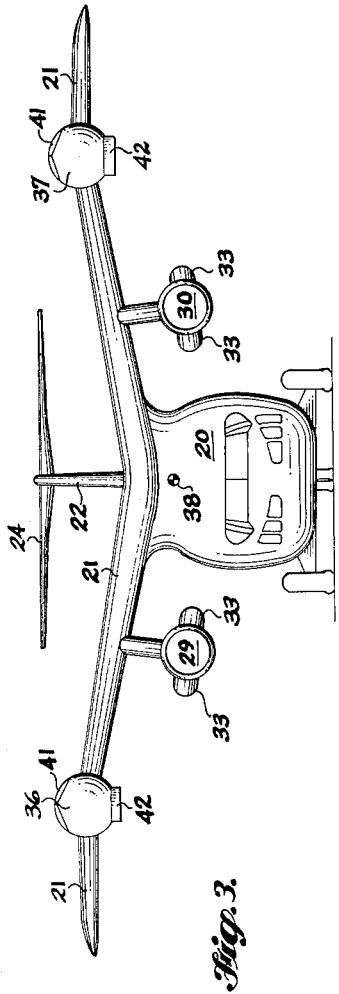

July 5, 1966 T. W. SCHMIDT 3,259,338
AIRCRAFT FOR SHORT AND/OR VERTICAL TAKE-OFF AND LANDING
Filed Feb. 17, 1964 3 Sheets-Sheet 3

INVENTOR.
THEODORE W. SCHMIDT
BY
Erwin F. Adams
ATTORNEY

Patent 3,259,338 — July 5, 1966

3,259,338
AIRCRAFT FOR SHORT AND/OR VERTICAL TAKE-OFF AND LANDING

Theodore W. Schmidt, Seattle, Wash., assignor to The Boeing Company, Seattle, Wash., a corporation of Delaware
Filed Feb. 17, 1964, Ser. No. 345,448
7 Claims. (Cl. 244—12)

This invention relates to aircraft adapted for S/VTOL (short and/or vertical take off and landing) and more particularly to the attitude control system of such aircraft including variation of the propulsion system moment arms.

Presently known attitude control systems for S/VTOL aircraft, when the aircraft is in vertical or hovering flight so that aerodynamic control surfaces do not function efficiently, are generally of the "reaction" or "throttling" types. Throttling control is accomplished by varying the thrust of the appropriately located engine with respect to the aircraft center of gravity. Reaction control generally consists of bleeding air from engines and ducting this air to the wing tips and the fuselage nose and tail and then controllably releasing this air to produce a thrust reaction and thereby to control the aircraft attitude. The disadvantage of these types of systems is that they substantially reduce the total lift thrust available for sustaining the aircraft in flight and therefore when such systems are employed it is generally necessary to incorporate into the aircraft design a greater thrust/weight ratio. Since it is believed that a minimum thrust/weight ratio of 1.2 should be held for satisfactory control, the throttling or reaction systems may result in a serious engine weight penalty. Additionally, throttling systems are generally too slow in an emergency.

It is the general object of this invention, therefore, to provide an instantaneous attitude control system operative during vertical or transition to or from horizontal cruise flight by varying the distance or lever arm about the aircraft center-of-gravity at which the lift thrust acts.

Another object is to provide hover maneuverability and attitude control for an aircraft at flight speeds in the V/STOL regime and during an emergency condition such as failure of one of the lift producing engines without appreciably decreasing the effectiveness of the available lift thrust produced by the remaining engines.

Still another object of the invention is to provide an aircraft configuration wherein the lift engines are partially disposed in the aircraft wing and related to the aircraft center-of-gravity so that an angular rotation of the lift engine thrust vector changes the moment arm length at which the thrust acts.

Figure 6:
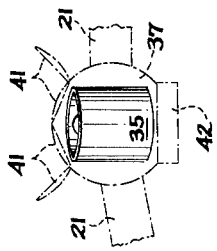
Figure 7:
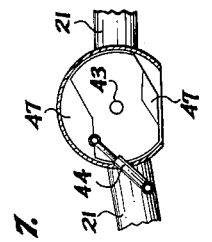
Figure 5:
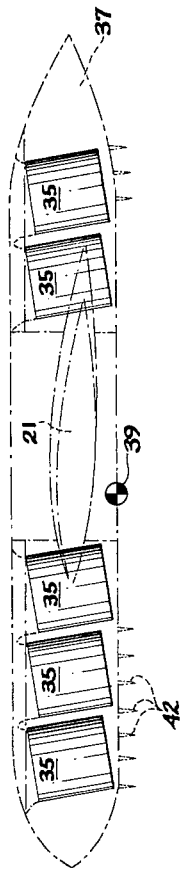
Figure 4:
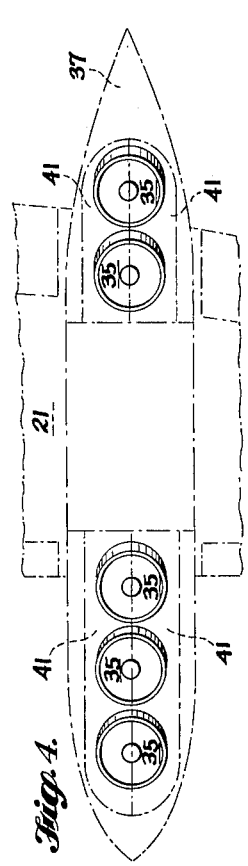
Figure 8:
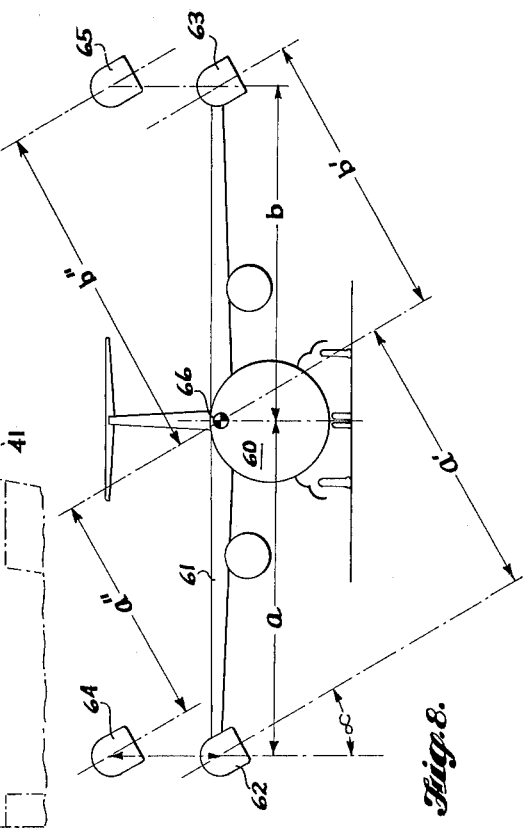

Other objects and advantages will become apparent when taken in connection with the accompanying drawings in which:

FIGURE 1 is a plan view of the aircraft according to the present invention;
FIGURE 2 is a side view of the aircraft;
FIGURE 3 is a front view of the aircraft;
FIGURE 4 is a plan view of the port lift engine nacelle of the aircraft, showing the lift engines in solid lines;
FIGURE 5 is a side view of the nacelle shown in FIGURE 4;
FIGURE 6 is a front view of the nacelle shown in FIGURES 4 and 5, showing the intake doors in an open position;
FIGURE 7 is a diagrammatic section view of the nacelle shown in FIGURE 6; and
FIGURE 8 is a front view of an aircraft showing the difference in moment arm variation dependent upon engine location relative to the aircraft center-of-gravity.

Generally stated, the invention comprises an aircraft having a fuselage wherein the center-of-gravity is located, a wing, and lift engine nacelles pivotally mounted about a longitudinal axis vertically displaced above the aircraft center-of-gravity.

As shown in FIGS. 1, 2 and 3, the aircraft illustrated is adapted for S/VTOL flight and consists of a fuselage 20, wing 21, an empennage including a vertical fin 22, a rudder 23, a horizontal stabilizer 24 and an elevator 25. The wing 21 is provided with full span leading edge flaps 26, trailing edge flaps 27, flaperons 28 and carries starboard and port jet propulsion cruise engines 29 and 30, respectively. Further outboard of the cruise engines are located lift engine nacelles or pods 36 and 37 which provide the principal vertical thrust or lift required for vertical, hovering or transitional flight. The cruise engines 29 and 30, however, may be used to supplement the lift through the auxiliary rotatable nozzles 33 and 34 mounted on each cruise engine.

In normal forward flight the aerodynamic control surfaces are operated to function conventionally and forward thrust is provided by cruise engines 29 and 30. In vertical, hovering or transitional flight, lift is provided through lift-devices comprising a plurality of lift-jet engines 35 located in pod-type nacelles 36 and 37. These nacelles are laterally spaced apart and symmetrically arranged with respect to the aircraft longitudinal axis and are pivotally mounted to the wing 21 above the center-of-gravity 38 of the aircraft.

Transitional flight occurs when the aircraft is changing between hover flight wherein the aircraft is supported by the direct lift of the lift engine 35, and cruise flight wherein the aircraft is supported by the lift of the wings 21. A very smooth transition is provided by this invention. As forward flight speed is begun and increased by acceleration of the cruise engines, the pilot gradually throttles back the lift engines as the wings develop lift until the wings are carrying all of the load of the aircraft and the lift engines are shut down completely. Likewise, as hover flight is desired, the pilot gradually throttles back the cruise engines, and lowers the flaps and tilts the nose up slightly, if desired, as he starts and gradually opens the throttle of the lift engines until all the load is carried by the lift engines, the cruise engines being cut down completely and the plane now being in hover or vertical flight.

In the illustrated embodiment of the lift engines within each nacelle, the port and starboard nacelles are identical and it will therefore be sufficient to describe one of them.

Referring now to FIGS. 4 through 6, the nacelle 37 contains five lift engines 35 arranged in tandem with three forward of the wing torsion box and two aft. This arrangement though structurally desirable is one of choice, as is the number of engines, and the engines may be arranged immediately adjacent to one another, if so desired. The engines are vertically mounted within the nacelle so as to discharge in a downward direction thereby producing a lifting force on the aircraft. Each of the lift-engines is fixed on its lateral axis and fixed relative to the aircraft's lateral axis relative to movement between the engine and the fuselage. The lateral axis of the engine may be either congruent with or parallel to the lateral axis of the aircraft. The upper surface of the nacelles 36, 37 have longitudinally extending engine air intake doors 41 and the lower nacelle surfaces have a plurality of vanes 42; both doors and vanes may be closed when engines 35 are not operating so as to present a smooth aerodynamic surface. The vanes 42 pivot on axes transverse to the nacelle and may be selectively positioned so as to direct the exhaust gases discharging from the engines in either a vertical or near vertical direction.

The center-of-thrust-lift 39 is located in the same body station or transverse vertical plane as aircraft C.G. 38 and this coincides with a position of approximately 25 to 30 percent of the means aerodynamic chord of wing 21. The vanes 42 control the direction of thrust of the engines in the longitudinal plane and since the axis of the vanes is vertically displaced above the aircraft C.G. 38 the pitch attitude of the aircraft may be easily controlled by selectively positioning the vanes.

When cruise engines 29 and 30 by means of rotatable nozzles 33 and 34 are used to provide auxiliary thrust for lift, the center-of-thrust-lift 40 of these engines is in the body station or transverse vertical plane of the normal aircraft C.G. 38 and center-of-thrust-lift 39.

The vanes 42 are also selectively operable to control aircraft yaw. Differential positioning e.g. port nacelle vanes deflected forward and starboard nacelle vanes deflected rearward to obtain a yaw to the left, is controllable by pilot moved members (not shown).

The greatest advantage provided by this invention is the highly effective roll control system, in combination with the aforementioned pitch and yaw control, resulting from the rotation of lift engines at a location which is vertically above and laterally spaced from the aircraft center-of-gravity. One embodiment of an aircraft which shows the location of the rotatable lift engine nacelles spaced apart and above the aircraft C.G. is shown in FIGURES 1 through 3 and mounting of the nacelle may be seen in FIG. 7. The nacelle 37 is rotatably mounted on wing 21, about its longitudinal axis on a shaft 43 resting in bearings secured to the wing. An actuating means, such as hydraulic actuator 44, is secured to the tiltable engine mounting nacelle structure 47 on one end and to the wing 21 structure on the other end.

Actuating forces for the nacelle rotation are minimal since the resultant thrust vector of the engines passes through the nacelle hinge point and produces bearing friction rather than a resisting moment. Controls (not shown) for actuator 44 are integrated with the aircraft aerodynamic control system (not shown) so that pilot control system operation regardless of the mode of flight remains the same. Rotation of the lift-devices, i.e. nacelle and the five lift engines 35 therein, changes the direction of thrust of the engines relative to the aircraft C.G. 38. The nacelle 36 rotation is limited so that the resultant lift thrust vector may be varied from vertical by 15 degrees outboard (maximum moment angle) to 30 degrees inboard (practical structural limitation). It may be seen that the advantage of tilting the entire pod lies in the synchronous movement of all five of the engines together. Furthermore, a less complicated installation results since a single swivel-type attachment point to the common engine mounting nacelle structure 47 for fuel, electrical, and other systems is required rather than separate attachment points to each engine.

The aircraft embodiment shown in FIGS. 1 through 3 also shows a wing arrangement which results in the desired lateral spacing and vertical displacement of the lift engine nacelle axes of rotation while the nacelles remain partially disposed in the wing. The vertical displacement of the lift engines 35 and therefore the resultant thrust vector rotation axis was accomplished by using a severe positive dihedral wing angle. However, a high wing aircraft requires that the "effective dihedral angle" be limited to approximately 3 degrees to maintain good control and stability characteristics in normal flight. To satisfy this requirement, the inboard portion of the wing out to the lift engine nacelles has a 10 degree positive dihedral angle while the outboard portion of the wing has a 2 degree negative dihedral angle. Since the outboard portion of the wing is further from the aircraft C.G. than the inner panel, it has a much greater lever arm and though smaller in area the moment produced by aerodynamic lift of this portion of the wing is essentially equivalent to the inboard portion moment. The total "effective dihedral angle" of the wing, therefore, is within proper design limits. The wing leading edge is straight, rather than swept back, since wing sweep has the effect of increasing the "effective dihedral angle"; though leading edge sweep may be provided by increasing the aspect ratio or the span of the outboard portion of the wing.

The positioning of the lift engine nacelles 36 and 37 is also structurally advantageous. The nacelles are located from the fuselage longitudinal axis at a distance of approximately 70 percent of the wing semi-span and presents a wing bending moment requirement for sustaining the aircraft in vertical flight by the lift engines 35 alone which is no greater than the design maneuver requirements during normal horizontal flight at the same aircraft gross weight.

Referring now to FIG. 8, the advantages of the new aircraft configuration described above as a roll control system in normal flight can be shown by comparison with a prior aircraft configuration in which the rotation axis of the pods is on the same horizontal plane as the aircraft C.G. The aircraft shown has a fuselage 60, wing 61 and lift-devices 62, 63 in the "single-plane" or prior configuration. Lift-devices 64, 65 are shown vertically displaced above the aircraft center-of-gravity 66 and will be referred to as a "dual-plane" or new configuration. To produce a roll moment about the aircraft C.G. 66 the lift or thrust vector is multiplied by the lever arm distance from the C.G. 66 to the thrust vector as measured by a line perpendicular to each thrust vector and passing through the aircraft C.G. In the "single-plane" or prior configuration rotation in the same direction of the lift-devices 62, 63 through an angle $\alpha$ changes the moment arms $a$ and $b$ to $a'$ and $b'$. However, these moment arms remain equal in length so that no roll moment is produced (since the lift force of both lift-devices is equal) and only a side force develops. In the "dual-plane" or new configuration, the vertical displacement of the rotation axes of the lift-devices causes a difference in moment arms between the thrust vectors from lift-devices 64 and 65 when both are rotated to the same angle $\alpha$. The difference in moment arms $a''$ and $b''$ produces a roll moment equal to the difference in lever arm lengths multiplied by the thrust. The same lateral force is produced as in the first considered configuration. To produce a roll moment in the "single-plane" or prior configuration, one of the two lift-devices must be rotated at a greater angle than the other. The disadvantageous result of this requirement for greater rotation of one lift-device is two-fold: (1) the total lift available for the aircraft is reduced, since the vertical component of thrust of the lift-device which has been rotated further is reduced; and (2) the lateral force produced is greater since the horizontal component of thrust of the further rotated lift-device increases and thereby the bank angle into which the plane must be maneuvered to prevent lateral dislocation becomes larger.

Considering now the operation of the control system in the novel "dual-plane" configuration during vertical or hovering flight, the advantages are also readily apparent. Rolling moments required to control the aircraft while hovering are similar to those just discussed. Additional problems in hovering flight may be created, however, if one of the lift engines of the aircraft ceases to operate or a gust causes the aircraft to bank. The success of elimination of the roll angle depends on the available roll moment which can be produced. The "dual-plane" configuration satisfies this requirement while providing maximum total lift which is critical during hovering flight and produces lateral forces which cause the aircraft to move in a direction relative to the ground opposite to the direction from which the gust emanated or the loss of thrust produced.

While there has been shown and described the fundamental novel features of this invention as applied to the preferred embodiment, it will be understood that various omissions and substitutions and changes in the form and details of the device illustrated may be made by those skilled in the art without departing from the spirit of the invention. It is the intention therefore to be limited only by the scope of the following claims and reasonable equivalents thereof.

I claim:
1. An aircraft having a center-of-gravity comprising:
 (a) a fuselage,
 (b) a wing fixedly attached to said fuselage and projecting laterally from both sides thereof;
 (c) a plurality of lift-devices pivotally mounted on said wing for discharging a propulsive gas stream in a substantially downward direction so as to provide an upward thrust on the aircraft, each of said lift-devices having a lateral axis, each of said lift-devices being fixed on its lateral axis relative to movement between the device and said fuselage, at least one of said lift devices being on each side of said fuselage and laterally spaced therefrom, each of said lift-devices having a pivotal axis, each of said pivotal axes being substantially parallel to the aircraft longitudinal axis and vertically displaced above said aircraft center-of-gravity; and
 (d) means to simultaneously rotate said lift-devices in the same direction so as to change the distance from said aircraft center-of-gravity to the thrust axes of said lift-devices as measured by a line perpendicular to each thrust axis and passing through the aircraft center-of-gravity.

2. The aircraft of claim 1 wherein the wing comprises:
 (a) an inboard portion having a positive dihedral; and
 (b) an outboard portion having a negative dihedral; said pivotally mounted lift-devices being positioned at the intersection of said inboard and outboard wing portions.

3. The aircraft of claim 2 wherein the wing has an effective dihedral angle of not more than three degrees.

4. An aircraft having a center-of-gravity comprising:
 (a) a fuselage,
 (b) a wing fixedly attached to said fuselage and projecting laterally from both sides thereof; and
 (c) means for providing attitude control of said aircraft comprising,
  (1) thrust producing lift-devices pivotally mounted on axes substantially parallel to said aircraft longitudinal axis and vertically displaced above said aircraft center-of-gravity for providing an upward thrust, at least one of said lift-devices being on each side of said fuselage and laterally displaced therefrom,
  (2) means to simultaneously rotate said lift-devices in the same direction so as to differentially change the distance from said aircraft center-of-gravity to each lift-device thrust vector between the lift-devices mounted on opposite sides of said fuselage as measured by a line perpendicular to each thrust vector and passing through the aircraft center-of-gravity, and
  (3) thrust axis directional means mounted on each of said lift-devices for angularly rotating the thrust vector of said lift-devices in a longitudinal plane to provide aircraft pitch and yaw moments.

5. The aircraft of claim 4 wherein the thrust producing lift-devices comprise:
 (a) lift engine nacelles partially disposed in said wing, each nacelle including
  (1) engine mounting nacelle structure rotatably journaled in said wing,
  (2) a plurality of vertically oriented lift engines mounted on said structure,
  (3) an aerodynamically smooth cowl enclosing said engines and said mounting structure and fixedly attached to the latter; and,
 (b) actuating means interconnecting each of said engine mounting nacelle structures to said wing for selective rotation of said nacelle.

6. The aircraft of claim 5 wherein each of said nacelles include:
 (a) air inlet means mounted in the upper surface of said cowl;
 (b) exhaust vanes pivotally mounted about axes transverse to the aircraft longitudinal axis; and
 (c) means for selective control of the thrust axes in a longitudinal plane.

7. In combination with an S/VTOL aircraft with a center-of-gravity, a longitudinal axis, a lateral axis, and having a wing on each side of the aircraft,
 (a) vertical lift means for each of said wings,
 (b) each of said vertical lift means being positioned above said center-of-gravity and rotatable about an axis parallel to the aircraft's longitudinal axis and each of said vertical lift means being fixed about the aircraft's lateral axis, and
 (c) means for rotating both of said vertical lift means simultaneously in the same direction for varying the relative effective lift thereof.

References Cited by the Examiner
UNITED STATES PATENTS

| 1,851,764 | 3/1932 | Hahn | 244—7 |
| 2,930,544 | 3/1960 | Howell | 244—12 |
| 3,031,157 | 4/1962 | Varden | 244—12 X |
| 3,066,889 | 12/1962 | Kelly | 244—12 |

FOREIGN PATENTS 283,980  1/1928  Great Britain.

OTHER REFERENCES

Buchstaller: German application No. 1,151,178, published July 4, 1963.

References Cited by the Applicant
UNITED STATES PATENTS

| 2,363,129 | 11/1944 | Heitmann. |
| 2,552,359 | 5/1951 | Winslow. |
| 2,562,905 | 8/1951 | Gadeberg. |
| 2,650,050 | 8/1953 | Chandler. |
| 2,736,515 | 2/1956 | Dolan et al. |
| 2,926,868 | 3/1960 | Taylor. |
| 2,939,654 | 6/1960 | Coanda. |
| 2,981,501 | 4/1961 | Schaefer. |
| 3,077,321 | 2/1963 | Dunham. |

MILTON BUCHLER, *Primary Examiner.*

G. P. EDGELL, L. C. HALL, *Assistant Examiners.*